US009521044B2

(12) United States Patent
Abraham et al.

(10) Patent No.: US 9,521,044 B2
(45) Date of Patent: Dec. 13, 2016

(54) SYSTEMS AND METHODS FOR DISCOVERING DEVICES IN A NEIGHBORHOOD AWARE NETWORK

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 14/195,677

(22) Filed: Mar. 3, 2014

(65) Prior Publication Data
US 2014/0254479 A1 Sep. 11, 2014

Related U.S. Application Data

(60) Provisional application No. 61/775,323, filed on Mar. 8, 2013, provisional application No. 61/824,911, filed on May 17, 2013.

(51) Int. Cl.
*H04W 4/00* (2009.01)
*H04L 12/24* (2006.01)
*H04W 8/00* (2009.01)
*H04W 48/16* (2009.01)

(52) U.S. Cl.
CPC ............. *H04L 41/12* (2013.01); *H04W 4/005* (2013.01); *H04W 4/006* (2013.01); *H04W 8/005* (2013.01); *H04W 48/16* (2013.01)

(58) Field of Classification Search
CPC .................. H04W 4/005–4/006; H04W 8/005; H04W 84/18–84/22; H04L 41/12; H04L 41/085–41/0853
See application file for complete search history.

(56) References Cited

U.S. PATENT DOCUMENTS

| 2003/0005036 | A1 | 1/2003 | Mitzenmacher |
| 2003/0117966 | A1* | 6/2003 | Chen ...................... H04L 45/02 370/255 |
| 2004/0215622 | A1 | 10/2004 | Dubnicki et al. |
| 2005/0068913 | A1 | 3/2005 | Tan et al. |

(Continued)

OTHER PUBLICATIONS

International Search Report and Written Opinion—PCT/US2014/020362—ISA/EPO—Jun. 18, 2014.

(Continued)

*Primary Examiner* — Michael Thier
*Assistant Examiner* — Eric Myers
(74) *Attorney, Agent, or Firm* — Knobbe Martens Olson & Bear, LLP

(57) ABSTRACT

Methods, devices, and computer program products communicating discovery information in a wireless neighborhood aware network (NAN). One method includes receiving a message from a neighboring wireless device. The message includes an identifier associated with the neighboring wireless device. The method further includes adding the identifier to a data structure indicative of discovered device identifiers. The method further includes transmitting a message including the data structure indicative of discovered device identifiers.

38 Claims, 12 Drawing Sheets

(56) References Cited

U.S. PATENT DOCUMENTS

| | | |
|---|---|---|
| 2006/0198379 A1 | 9/2006 | Cadambi et al. |
| 2007/0177554 A1 | 8/2007 | Yang et al. |
| 2008/0002599 A1 | 1/2008 | Yau et al. |
| 2010/0285790 A1 | 11/2010 | Baliosian et al. |
| 2011/0106837 A1 | 5/2011 | Walton et al. |
| 2013/0077525 A1 | 3/2013 | Bejerano et al. |
| 2013/0201997 A1 | 8/2013 | Masputra et al. |
| 2014/0108643 A1 | 4/2014 | Hui et al. |
| 2014/0254513 A1 | 9/2014 | Abraham et al. |
| 2015/0207793 A1* | 7/2015 | Mohamed ............ H04L 63/166 726/6 |

OTHER PUBLICATIONS

Tarkoma S., et al., "Theory and Practice of bloom filters for distributed systems," IEEE Communications Surveys & Tutorials, IEEE, New York, NY, US, First Quarter 2012 (Jan. 1, 2012), vol. 14 (1), pp. 131-155, XP011420414, ISSN: 1553-877X, DOI: 10.1109/SURV.2011.031611.00024.

\* cited by examiner

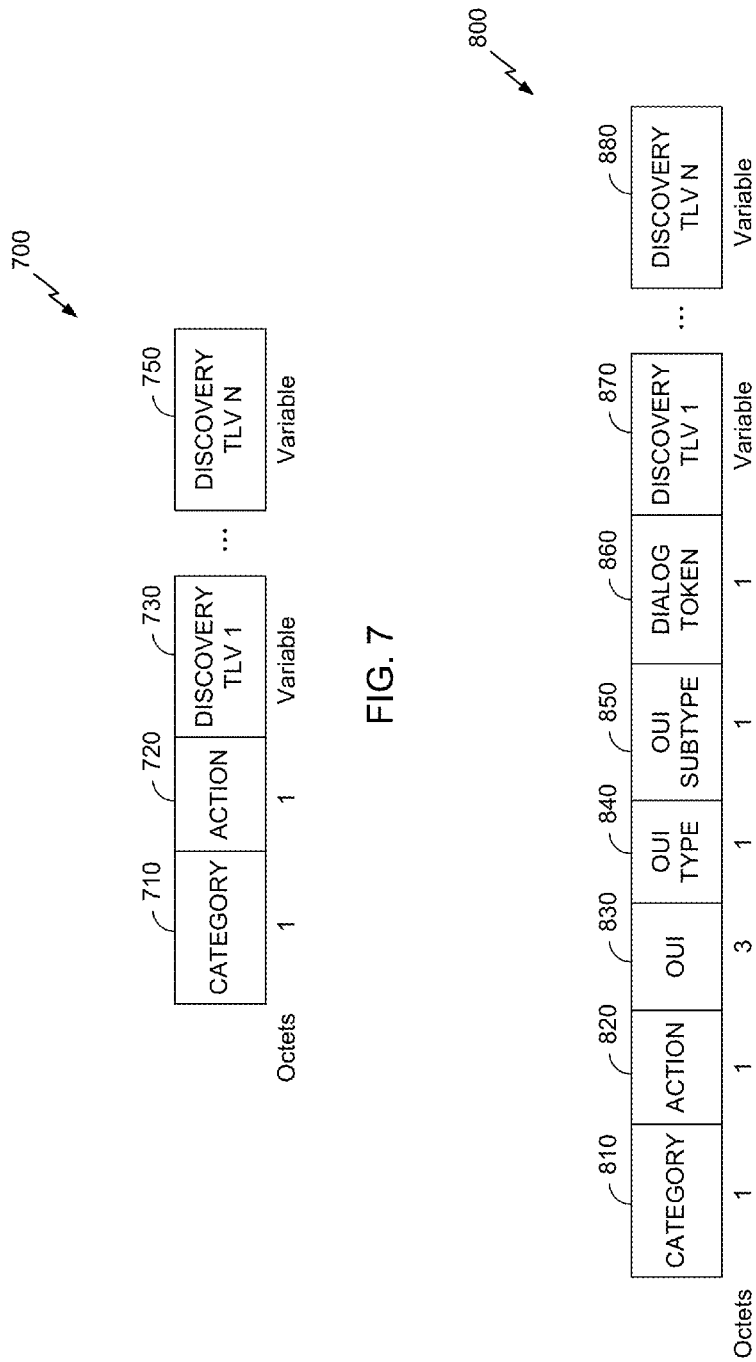

SYSTEMS AND METHODS FOR DISCOVERING DEVICES IN A NEIGHBORHOOD AWARE NETWORK

CROSS-REFERENCE TO RELATED APPLICATIONS

This application claims the benefit of U.S. Provisional Application Nos. 61/775,323, filed Mar. 8, 2013 and 61/824, 911, filed May 17, 2013, the entire contents of each of which is incorporated herein by reference. This application is related to U.S. application Ser. No. 14/195,721, filed on even date herewith, entitled "SYSTEMS AND METHODS FOR DISCOVERING DEVICES IN A NEIGHBORHOOD AWARE NETWORK."

FIELD

The present application relates generally to wireless communications, and more specifically to systems, methods, and devices for discovering devices in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit/receive information between each other. The information can include packets, which in some aspects can be referred to as data units or data frames. The packets can include identifying information that can be used to discover devices in the wireless network. In some cases, extraneous identifying information can be transmitted, increasing network overhead. Thus, improved systems, methods, and devices for efficiently communicating identifying information are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the subject matter described in the disclosure provides a method of communicating discovery information in a wireless neighborhood aware network (NAN). The method includes receiving a message from a neighboring wireless device. The message includes an identifier associated with the neighboring wireless device. The method further includes adding the identifier to a data structure indicative of discovered device identifiers. The method further includes transmitting a message including the data structure indicative of discovered device identifiers.

Another aspect of the subject matter described in the disclosure provides a method of communicating discovery information in a wireless neighborhood aware network (NAN). The method includes receiving, at a first wireless device, a message from a neighboring wireless device. The message includes a data structure indicative of discovered device identifiers. The method further includes determining whether the data structure indicates an identifier of the first wireless device. The method further includes transmitting a message including the identifier of the first wireless device when the data structure does not indicate the identifier of the first wireless device.

Another aspect of the subject matter described in the disclosure provides a wireless device configured to communicate discovery information in a wireless neighborhood aware network (NAN). The device includes a receiver configured to receive a message from a neighboring wireless device. The message includes an identifier associated with the neighboring wireless device. The device further includes a memory configured to store a data structure indicative of discovered device identifiers. The device further includes a processor configured to add the identifier to the data structure stored in the memory. The device further includes a transmitter configured to transmit a message including the data structure indicative of discovered device identifiers.

Another aspect of the subject matter described in the disclosure provides a first wireless device configured to communicate discovery information in a wireless neighborhood aware network (NAN). The device includes a receiver configured to receive a message from a neighboring wireless device. The message includes a data structure indicative of discovered device identifiers. The device further includes a processor configured to determine whether the data structure indicates an identifier of the first wireless device. The device further includes a transmitter configured to transmit a message including the identifier of the first wireless device when the data structure does not indicate the identifier of the first wireless device.

Another aspect of the subject matter described in the disclosure provides an apparatus for communicating discovery information in a wireless neighborhood aware network (NAN). The apparatus includes means for receiving a message from a neighboring wireless device. The message includes an identifier associated with the neighboring wireless device. The apparatus further includes means for adding the identifier to a data structure indicative of discovered device identifiers. The apparatus further includes means for transmitting a message including the data structure indicative of discovered device identifiers.

Another aspect of the subject matter described in the disclosure provides an apparatus for communicating discovery information in a wireless neighborhood aware network (NAN). The apparatus includes means for receiving a message from a neighboring wireless device. The message includes a data structure indicative of discovered device identifiers. The apparatus further includes means for determining whether the data structure indicates an identifier of the apparatus. The apparatus further includes means for transmitting a message including the identifier of the apparatus when the data structure does not indicate the identifier of the apparatus.

Another aspect of the subject matter described in the disclosure provides a non-transitory computer-readable medium including code that, when executed, cause an apparatus to receive a message from a neighboring wireless device. The message includes an identifier associated with the neighboring wireless device. The medium further includes code that, when executed, causes the apparatus to add the identifier to a data structure indicative of discovered device identifiers. The medium further includes code that, when executed, causes the apparatus to transmit a message including the data structure indicative of discovered device identifiers.

Another aspect of the subject matter described in the disclosure provides a non-transitory computer-readable medium including code that, when executed, causes an apparatus to receive a message from a neighboring wireless device. The message includes a data structure indicative of discovered device identifiers. The medium further includes code that, when executed, causes the apparatus to determine whether the data structure indicates an identifier of the apparatus. The medium further includes code that, when executed, causes the apparatus to transmit a message including the identifier of the apparatus when the data structure does not indicate the identifier of the apparatus.

BRIEF DESCRIPTION OF THE DRAWINGS

FIG. 7 illustrates an example neighborhood aware network discovery frame.

FIG. 8 illustrates an example vendor-specific discovery frame.

DETAILED DESCRIPTION

Figure 1:
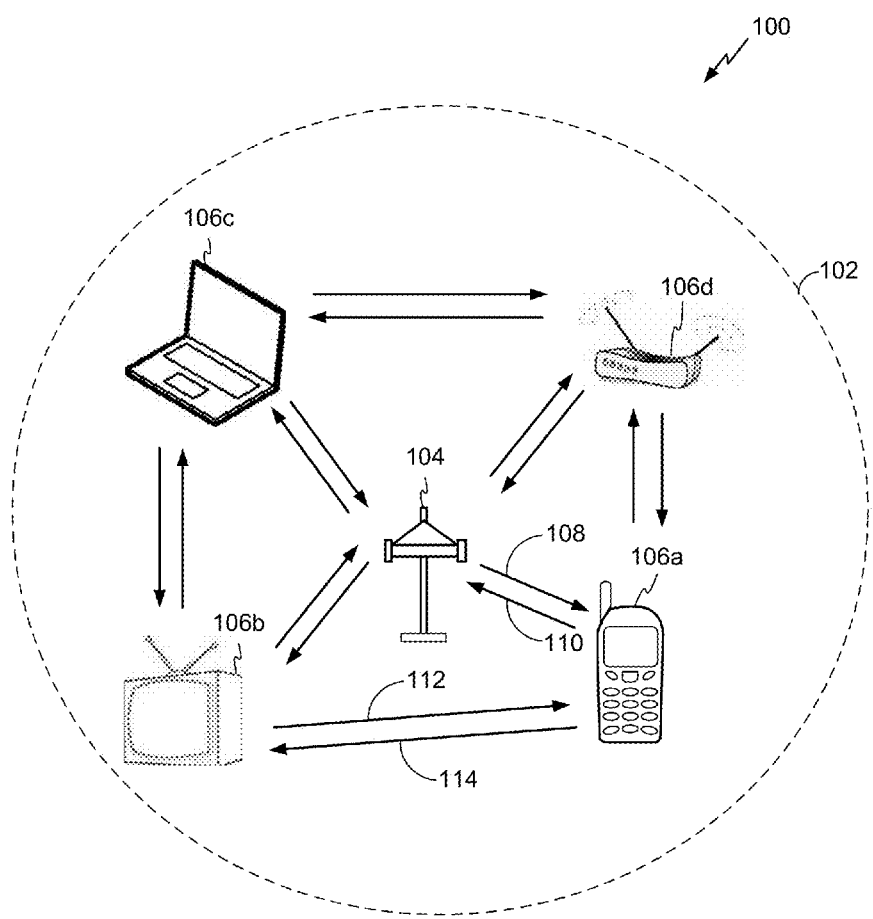
FIG. 1 illustrates an example of a wireless communication system in which aspects of the present disclosure can be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, can be used for neighborhood aware networking (NAN), or social-WiFi networking. For example, various stations within the network can communicate on a device to device (e.g., peer-to-peer communications) basis with one another regarding applications that each of the stations supports. It is desirable for a discovery protocol used in a social-WiFi network to enable STAs to advertise themselves (e.g., by sending discovery packets) as well as discover services provided by other STAs (e.g., by sending paging or query packets), while ensuring secure communication and low power consumption. It should be noted that a discovery packet can also be referred to as a discovery message or a discovery frame. It should also be noted that a paging or query packet can also be referred to as a paging or query message or a paging or query frame.

FIG. 1 illustrates an example of a wireless communication system 100 in which aspects of the present disclosure can be employed. The wireless communication system 100 can operate pursuant to a wireless standard, such as an 802.11 standard. The wireless communication system 100 can include an AP 104, which communicates with STAs 106. In some aspects, the wireless communication system 100 can include more than one AP. Additionally, the STAs 106 can communicate with other STAs 106. As an example, a first STA 106a can communicate with a second STA 106b. As another example, a first STA 106a can communicate with a third STA 106c although this communication link is not illustrated in FIG. 1.

A variety of processes and methods can be used for transmissions in the wireless communication system 100 between the AP 104 and the STAs 106 and between an individual STA, such as the first STA 106a, and another individual STA, such as the second STA 106b. For example, signals can be sent and received in accordance with OFDM/OFDMA techniques. If this is the case, the wireless communication system 100 can be referred to as an OFDM/OFDMA system. Alternatively, signals can be sent and received between the AP 104 and the STAs 106 and between an individual STA, such as the first STA 106a, and another individual STA, such as the second STA 106b, in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

A communication link can be established between STAs, such as during social-WiFi networking. Some possible communication links between STAs are illustrated in FIG. 1. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
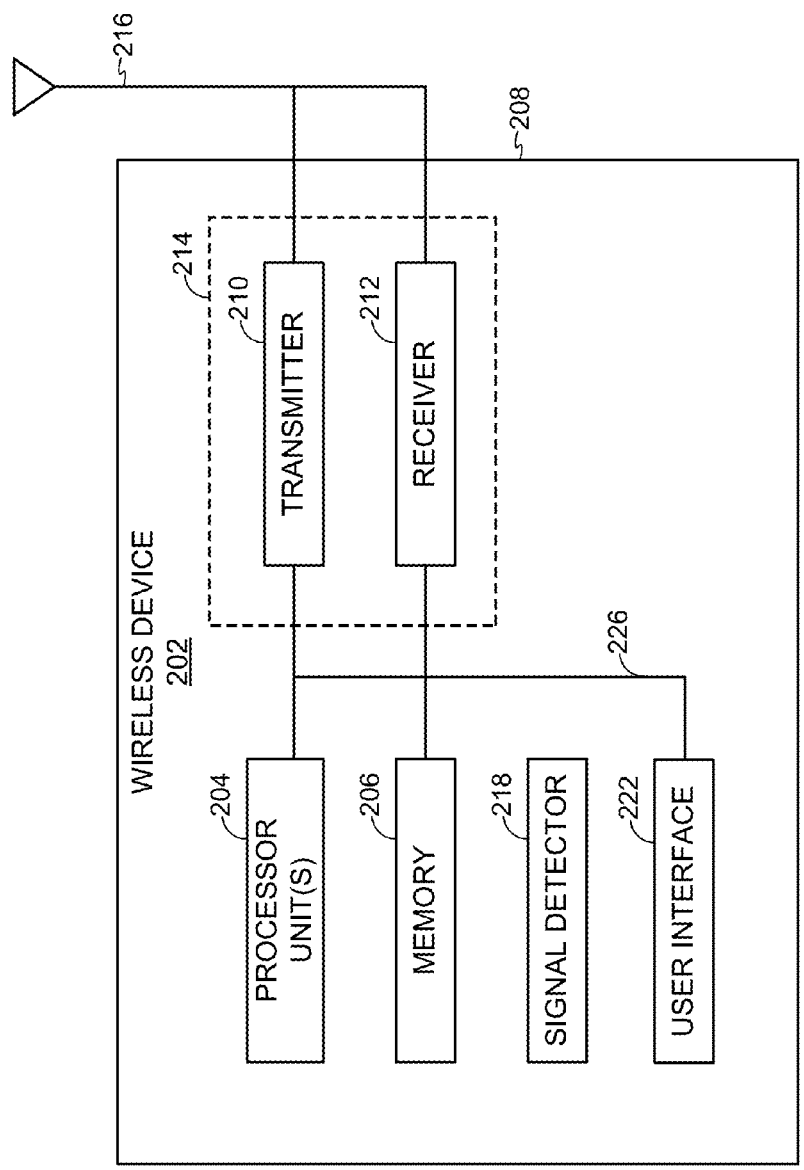
FIG. 2 illustrates a functional block diagram of a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can include the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet including a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

To ensure proper communication between devices such as AP 104 and the STAs 106 or between multiple STAs 106, the AP 104 or STAs 106 can receive information regarding characteristics of the AP 104 or STAs 106. For example, the STA 106 can use timing information about the AP 104 in order to synchronize timing of communication between the STA 106 and the AP 104. Additionally or alternatively, the STA 106 can require other information such as a medium access control (MAC) address of the AP 104 or another STA, an identifier of the basic service set (BSS) served by the AP 104, etc. The STA 106 can determine whether it needs such information independently, such as through software that is executed using memory 206 and processor 204.

The AP 104 or STA 106 can have a plurality of operational modes. For example, the STA 106 can have a first operational mode referred to as an active mode, normal operation mode, or full power mode. In the active mode, the STA 106 can always be in an "awake" state and actively transmit/receive data with another STA 106. Further, the STA 106 can have a second operational mode referred to as a power-save mode or sleep mode. In the power-save mode, the STA 106 can be in the "awake" state or can be in a "doze" or "sleep" state where the STA 106 does not actively transmit/receive data with another STA 106. For example, the receiver 212 and possibly DSP 220 and signal detector 218 of the STA 106 can operate using reduced power consumption in the doze state. Further, in the power-save mode, a STA 106 can occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3:
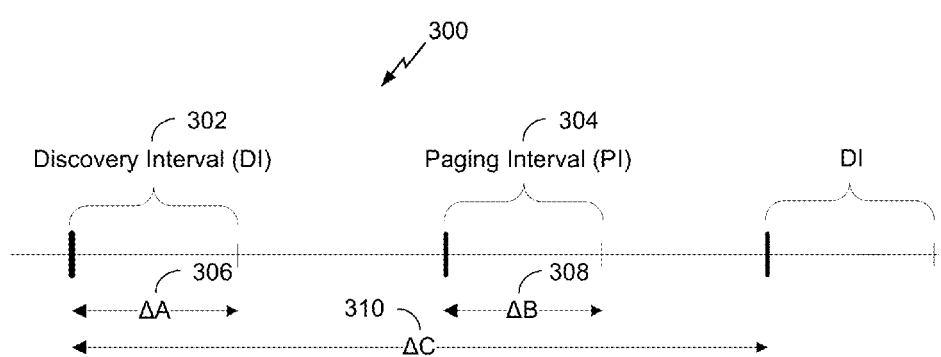
FIG. 3 illustrates an exemplary communication timeline in a wireless communication system in accordance with aspects of the present disclosure.

FIG. 3 illustrates an exemplary communication timeline 300 in a wireless communication system where devices can communicate via one channel. The exemplary communication timeline 300 can include a discovery interval (DI) 302 of a time duration $\Delta A$ 306, a paging interval (PI) 304 of a time duration AB 308, and an overall interval of a time duration $\Delta C$ 310. In some aspects, communications can occur via other channels as well. Time increases horizontally across the page over the time axis.

During the DI 302, APs or STAs can advertise services through broadcast messages such as discovery packets. In some embodiments, the DI 302 can be referred to as a discovery window (DW). APs or STAs can listen to broadcast messages transmitted by other APs or STAs. In some aspects, the duration of DIs can vary over time. In other aspects, the duration of the DI can remain fixed over a period of time. The end of the DI 302 can be separated from the beginning of the subsequent PI 304 by a first remainder period of time as illustrated in FIG. 3. The end of the PI 304 can be separated from the beginning of a subsequent DI by a different remainder period of time as illustrated in FIG. 3.

During the PI 304, APs or STAs can indicate interest in one or more of a plurality of services advertised in a broadcast message by transmitting paging request messages such as paging request packets. APs or STAs can listen to paging request messages transmitted by other APs or STAs. In some aspects, the duration of the PI can vary over time. In other aspects, the duration of the PI can remain constant over a period of time. In some aspects, the duration of the PI can be less than the duration of the DI.

The overall interval of duration $\Delta C$ 310 can measure the period of time from the beginning of one DI to the beginning of a subsequent DI as illustrated in FIG. 3. In some embodiments, the duration $\Delta C$ 310 can be referred to as a discovery period (DP). In some aspects, the duration of the overall interval can vary over time. In other aspects, the duration of the overall interval can remain constant over a period of time. At the conclusion of the overall interval of duration $\Delta C$ 310, another overall interval can begin, including a DI, a PI, and the remainder intervals. Consecutive overall intervals can follow indefinitely or continue for a fixed period of time.

A STA can enter a sleep or power-save mode when the STA is not transmitting or listening or is not expecting to transmit or listen. As an example, the STA can sleep during periods other than the DI or PI. The STA in the sleep mode or power-save mode can awake or return to normal operation or full power mode at the beginning of the DI or PI to enable transmission or listening by the STA. In some aspects, the STA can awake or return to normal operation or full power mode at other times when the STA expects to communicate with another device, or as a result of receiving a notification packet instructing the STA to awake. The STA can awake early to ensure that the STA receives a transmission.

As described above, during the DI, APs or STAs can transmit discovery packets (DPs). During the PI, APs or STAs can transmit paging request packets (PRs). A DP can be a packet configured to advertise a plurality of services provided by a STA or AP and to indicate when the paging interval is for the device that transmits the discovery packet. The DP can include a data frame, management frame, or management action frame. The DP can carry information generated by a higher layer discovery protocol or an application based discovery protocol. The PR can be a packet configured to indicate interest in at least one of the plurality of services provided by an AP or STA.

The start and end of the DI and PI can be known via numerous methods to each STA desiring to transmit a discovery packet or a paging request packet. In some aspects, each STA can synchronize its clock with the other APs or STAs and set a shared DI and PI start time and DI duration and PI duration. In other aspects, a device can send a signal such as a special clear to send (S-CTS) signal to clear the medium of legacy communications, such as communications that can conflict or not be compliant with aspects of the present disclosure, and indicate the beginning and duration of the DI or PI period, as well as additional information about the DI and PI durations.

A STA potentially interested in services advertised via discovery packets, such as from other STAs, can awake or remain awake during the DI and process discovery packets to determine if a particular discovery packet includes information about one or more of a plurality of services that can be of interest to the receiving STA. After the DI period, STAs not planning to communicate information can enter a sleep or power-save mode for a break period until the next time the STAs plan to communicate. In some aspects, a STA can enter the sleep or power-save mode until the STA can communicate additional information with another device outside of the DI or PI. In some aspects, the STA can enter the sleep or power-save mode until the beginning of the next PI. At the beginning of the PI, the interested STA can awake to transmit a paging request packet to the provider of the service.

A STA waiting for a response to a transmitted discovery packet, such as discovery packets transmitted to other STAs, can awake or remain awake during the PI and process paging request packets to determine if a particular paging request packet indicates interest by another device in at least one of plurality of services provided by the STA. After the PI period, STAs not planning to communicate information can enter a sleep or power-save mode for a break period until the next time the STAs plan to communicate. In some aspects, a STA can enter the sleep or power-save mode until the STA can communicate additional information with another device outside of the DI or PI. In some aspects, the STA can enter the sleep or power-save mode until the beginning of the next DI.

As examples, the duration $\Delta C$ of the overall interval can equal approximately one to five seconds in some aspects. In other aspects, the overall interval can be less than one second or more than five seconds. The duration $\Delta A$ of the DI can equal approximately 16 ms in some aspects while more or less than 16 ms in other aspects. The duration $\Delta B$ of the PI can equal approximately the duration $\Delta A$ in some aspects. In other aspects, the duration $\Delta B$ can be more or less than the duration $\Delta A$.

Figure 4:
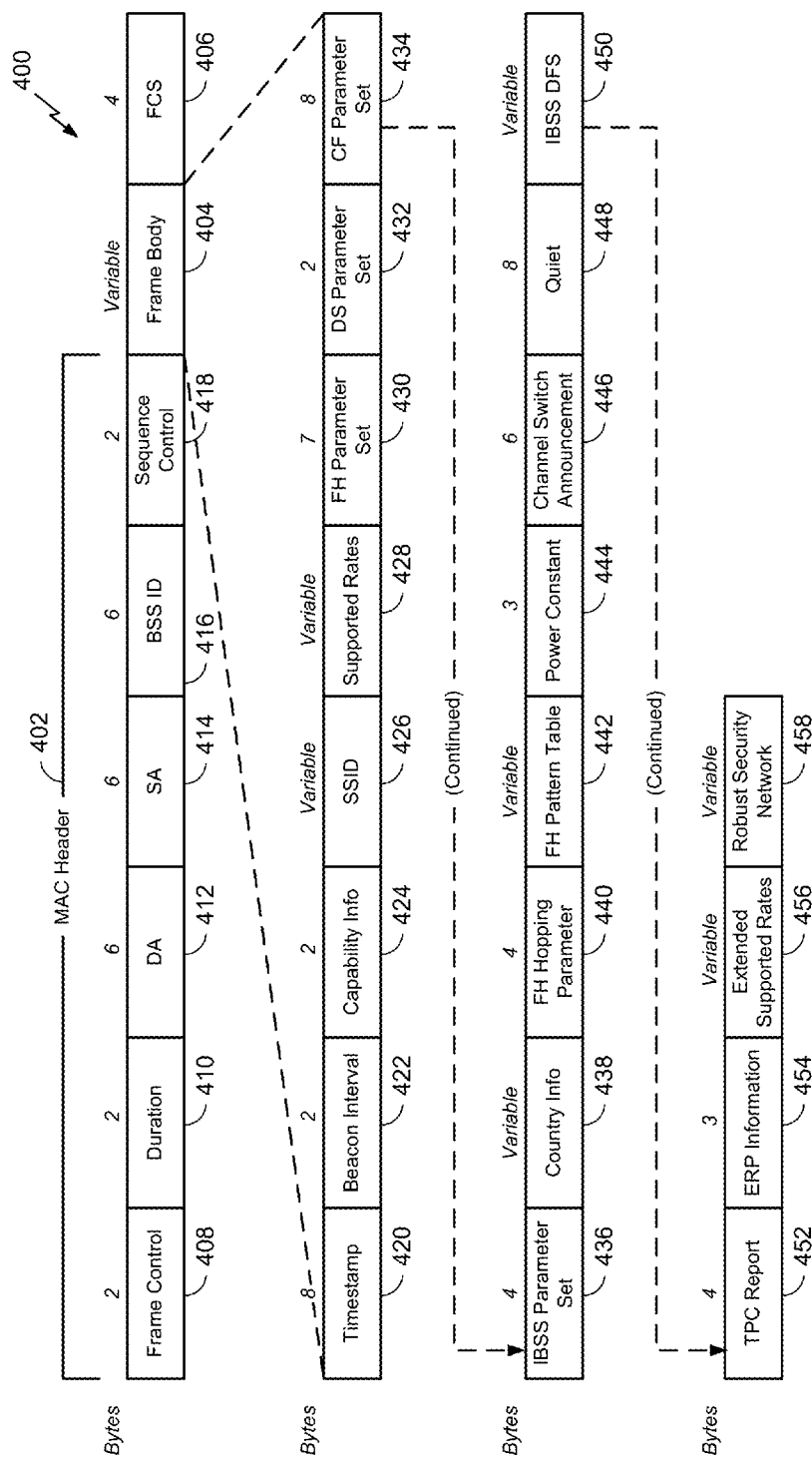
FIG. 4 illustrates an example of a beacon frame used in legacy systems for communication.

FIG. 4 illustrates an example of a beacon frame 400 used in legacy systems for communication. As shown, the beacon 400 includes a median access control (MAC) header 402, a frame body 404, and a frame control sequence (FCS) 406. As shown, the MAC header 402 is 24 bytes long, the frame body 404 is of variable length, and the FCS 406 is four bytes long.

The MAC header 402 serves to provide basic routing information for the beacon frame 400. In the illustrated embodiment, the MAC header 402 includes a frame control (FC) field 408, a duration field 410, a destination address (DA) field 412, a source address (SA) field 414, a basic service set identification (BSSID) field 416, and a sequence control field 418. As shown, the FC field 408 is two bytes long, the duration field 410 is two bytes long, the DA field 412 is six bytes long, the SA field 414 is six bytes long, the BSSID field 416 is six bytes long, and the sequence control field 418 is two bytes long.

The frame body 404 serves to provide detailed information about the transmitting node. In the illustrated embodiment, the frame body 404 includes a timestamp field 420, a beacon interval field 422, a capability information field 424, a service set identifier (SSID) field 426, a supported rates field 428, a frequency-hopping (FH) parameter set 430, a direct-sequence parameter set 432, a contention-free parameter set 434, an independent basic service set (IBSS) parameter set 436, a country information field 438, a FH hopping parameter field 440, a FH pattern table 442, a power constraint field 444, a channel switch announcement field 446, a quiet field 448, a IBSS direct frequency selection (DFS) field 450, a transmit power control (TPC) field 452, an effective radiated power (ERP) information field 454, an extended supported rates field 456, and a robust security network (RSN) field 458.

As shown in FIG. 4, the timestamp field 420 is eight bytes long, the beacon interval field 422 is two bytes long, the capability information field 424 is two bytes long, the service set identifier (SSID) field 426 is a variable length, the supported rates field 428 is a variable length, the frequency-hopping (FH) parameter set 430 is seven bytes long, the direct-sequence parameter set 432 is two bytes long, the contention-free parameter set 434 is eight bytes long, an independent basic service set (IBSS) parameter set 436 is 4 bytes long, the country information field 438 is a variable length, the FH hopping parameter field 440 is four bytes long, the FH pattern table 442 is a variable length, the power constraint field 444 is three bytes long, the channel switch announcement field 446 is six bytes long, the quiet field 448 is eight bytes long, the IBSS direct frequency selection (DFS) field 450 is a variable length, the transmit power control (TPC) field 452 is four bytes long, an effective radiated power (ERP) information field 454 is three bytes long, an extended supported rates field 456 is a variable length, and the robust security network (RSN) field 458 is a variable length.

Referring still to FIG. 4, although the beacon frame 400 is a variable length, it is always at least 89 bytes long. In various radio environments, much of the information contained in the beacon frame 400 can be used infrequently or not at all. Accordingly, in low-power radio environments, it can be desirable to reduce the length of the beacon frame 400 in order to reduce power consumption. Moreover, some radio environments use low data rates. For example an access point implementing an 802.11ah standard can take a relatively long time to transmit the beacon frame 400 due to relatively slow data transmission rates. Accordingly, it can be desirable to reduce the length of the beacon frame 400 in order to shorten the amount of time it takes to transmit the beacon frame 400.

In various embodiments, neighborhood aware networks can use a synchronization beacon formatted to be compatible with existing hardware configured to decode the beacon frame 400. For example, one or more STAs and/or APs in a neighborhood aware network can transmit a NAN beacon frame, which can be used to maintain synchronization across STAs in the NAN. In some embodiments, various fields in the beacon frame 400 can be removed, resized, and/or repurposed.

Figure 5:
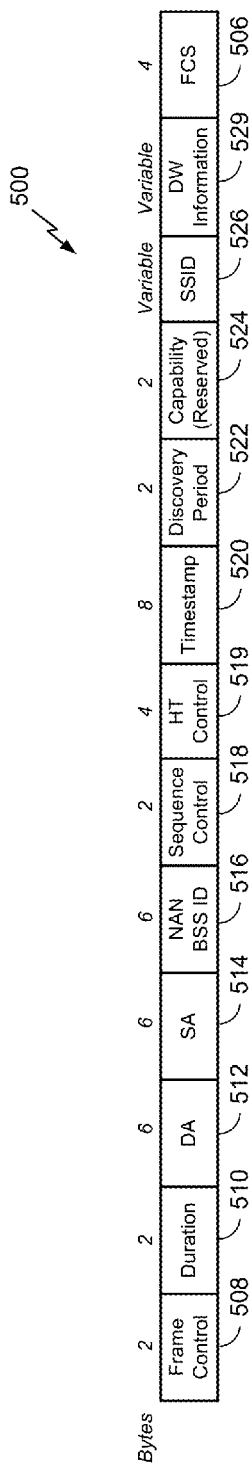
FIG. 5 illustrates an example neighborhood aware network beacon frame.

FIG. 5 illustrates an example neighborhood aware network beacon frame 500. In the illustrated embodiment, the NAN beacon frame 500 includes a frame control (FC) field 508, a duration field 510, a destination address (DA) field 512, a source address (SA) field 514, a NAN BSSID field 516, a sequence control field 518, a high-throughput (HT) control field 519, a timestamp 520, a discovery period field 522, a reserved capability field 524, an SSID field 526, a discovery window (DW) information field 529, and a frame check sequence (FCS) 506. As shown, the frame control (FC) field 508 is 2 bytes long, the duration field 510 is 2 bytes long, the destination address (DA) field 512 is 6 bytes long, the source address (SA) field 514 is 6 bytes long, the NAN BSSID field 516 is 6 bytes long, the sequence control field 518 is 2 bytes long, the high-throughput (HT) control field 519 is 4 bytes long, the timestamp 520 is 8 bytes long, the discovery period field 522 is 2 bytes long, the reserved capability field 524 is 2 bytes long, an SSID field 526 a variable length, the discovery window (DW) information field 529 is a variable length, and the frame check sequence (FCS) 506 is 4 bytes long. In various embodiments, the NAN beacon frame 500 can omit one or more fields shown in FIG. 5 and/or include one or more fields not shown in FIG. 5, including any of the fields discussed herein. A person having ordinary skill in the art will appreciate that the fields in the NAN beacon frame 500 can be of different suitable lengths, and can be in a different order.

In various embodiments, one or more of the frame control (FC) field 508, the duration field 510, the destination address (DA) field 512, the source address (SA) field 514, the sequence control field 518, the timestamp 520, the SSID field 526, and the frame check sequence (FCS) 506 can include the frame control (FC) field 408, the duration field 410, the destination address (DA) field 412, the source address (SA) field 414, the sequence control field 418, the timestamp 420, the SSID field 426, and the frame check sequence (FCS) 406 described above with respect to FIG. 4, respectively. Accordingly, the frame control (FC) field 508, the duration field 510, the destination address (DA) field 512, the source address (SA) field 514, the NAN BSSID field 516, and the sequence control field 518 can be configured to have the same format as a legacy MAC header, such as the MAC header 402 of FIG. 4. The NAN beacon frame 500 can be formatted for processing by legacy hardware, without modification.

In some embodiments, the NAN BSSID field 516 can have the same format as the BSSID field 416 described above with respect to FIG. 4, but can be interpreted differently. In one embodiment, the NAN BSSID 516 can include a predetermined or token BSSID, used in all NAN synchronization frames. Accordingly, different networks can include the same NAN BSSID in synchronization frames. The token BSSID can be preset, universally known, and/or dynamically determined. In some embodiments, the DA field 512 can be set to a broadcast address, and the SA field 514 can be set to a sender address.

In another embodiment, each NAN can have a different (for example, pseudorandom) NAN BSSID 516. In an embodiment, the NAN BSSID 516 can be based on a service application. For example, a NAN created by Application A can have a BSSID 516 based on an identifier of Application A. In some embodiments, the NAN BSSID 516 can be defined by a standards-body. In some embodiments, the NAN BSSID 516 can be based on other contextual information and/or device characteristics such as, for example, a device location, a server-assigned ID, etc. In one example, the NAN BSSID 516 can include a hash of the latitude and longitude location of the NAN.

In an embodiment, the frame control field 508 can include a type indicator. The FC 508 type indicator can indicate that the NAN beacon 500 is a management frame. In an embodiment, a STA 106 (FIG. 1) can set the type indicator to a beacon management frame. In some embodiments, one or more fields of the NAN beacon 500 can be sent as a probe response, and the FC 508 type indicator can indicate that the frame is a probe response.

In some embodiments, the timestamp 520 can have the same format as the timestamp 420 described above with respect to FIG. 4, but can be interpreted differently. In an embodiment, the timestamp 520 can include the clock time of a transmitting device, at the time of transmission or at the time of frame compilation. In an embodiment, a STA 106 (FIG. 1) can set the timestamp 520 to an internal clock value.

In some embodiments, the discovery period field 522 can have the same format as the beacon interval field 422 described above with respect to FIG. 4, but can be interpreted differently. In an embodiment, the discovery period field 522 can indicate a length of the discovery period 310 (described above with respect to FIG. 3). For example, the timestamp 520 can indicate when the discovery interval 302 will start with respect to the discovery period 310.

In some embodiments, the reserved capability field 524 can have the same format as the capability information field 424 described above with respect to FIG. 4, but can be include reserved bits. Accordingly, a receiving STA 106 (FIG. 1) can decode the NAN beacon 500 using legacy hardware, but can ignore the value of the reserved capability field 524. In an embodiment, the reserved capability field 524 can include additional information regarding the NAN.

In some embodiments, the SSID field 526 can have the same format as the SSID field 426 described above with respect to FIG. 4, but can be interpreted differently. In an embodiment, the SSID field 426 can carry an application identifier. In an embodiment, the SSID field 426 can be omitted. In an embodiment, the SSID field 426 can include a network identifier.

The discovery window information field 529 can provide information related to the discovery window 302 described above with respect to FIG. 3. In various embodiments, a STA 106 (FIG. 1) can transmit the NAN beacon at any time during the discovery window 302. Accordingly, a receiving device may not be able to determine a start time of the discovery window 302 based on the transmission time of the NAN beacon 500. In an embodiment, the discovery window information field 529 can indicate an offset or start time of the discovery interval 302 (described above with respect to FIG. 3). For example, the timestamp 520 can indicate when the discovery interval 302 will start with respect to the discovery period 310. Accordingly, a receiving STA 106 can determine a wake-up time based on the discovery window information field 529.

In some embodiments, one or more devices that are not NAN-aware can receive the NAN beacon 500. In some configurations, such legacy devices can interpret the NAN beacon 500 as legacy beacons, such as the beacon 400 described above with respect to FIG. 4. For example, a legacy device can receive a plurality of NAN beacons 500, having a plurality of different NAN BSSID fields 516. In some embodiments, the NAN beacon 500 can be configured such that legacy devices can ignore or discard the NAN beacon 500. In other embodiments, the NAN beacon 500 can be configured so as to reduce the number of different NAN BSSID fields 516 visible to the legacy devices.

In an embodiment the DA 512 can be set to a multicast address, or group of addresses, indicating that the beacon 500 is a NAN beacon. The multicast address, or group of addresses, indicating that the beacon 500 is a NAN beacon can be predetermined, stored in a memory 206 (FIG. 2), and/or set by a standards body. NAN-aware devices can be configured to listen to the NAN multicast address, or group of addresses. Legacy devices can be configured to ignore or discard the NAN multicast address, or group of addresses.

In some embodiments, the SA 514 can be set to a different address from the NAN BSSID 516. For example, the SA 514 can be set to an address of a wireless device 202 (FIG. 2). As discussed above, the NAN BSSID 516 can include a predetermined or token BSSID, used in all NAN synchronization frames, an application-based BSSID, etc. Because some legacy devices can assume that beacon frames have identical SA 514 and BSSID 516 values, some legacy devices can discard or ignore the NAN beacon 500 having different values in the SA 514 and BSSID 516 fields.

In other embodiments, the SA 514 can be set to the NAN BSSID 516, independent of an address of the wireless device 202 (FIG. 2). As discussed above, the NAN BSSID 516 can include a predetermined or token BSSID, used in all NAN synchronization frames. Because some legacy devices can track separate BSSID values seen in beacon frames, reducing the number of different NAN BSSID 516 values used can reduce the number of different networks tracked on the legacy devices.

Figure 6:
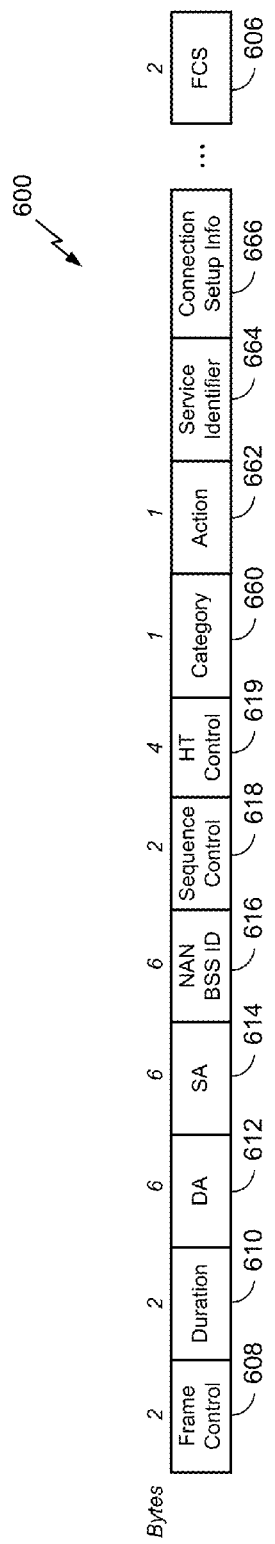
FIG. 6 illustrates an example neighborhood aware network discovery frame.

FIG. 6 illustrates an example neighborhood aware network discovery frame 600. In the illustrated embodiment, the NAN discovery frame 600 includes a frame control (FC) field 608, a duration field 610, a destination address (DA) field 612, a source address (SA) field 614, a NAN BSSID field 616, a sequence control field 618, a high-throughput (HT) control field 619, a category field 660, and action field 662, a service identifier 664, a connection setup information field 666, and a frame check sequence (FCS) 606. As shown, the frame control (FC) field 608 is 2 bytes long, the duration field 610 is 2 bytes long, the destination address (DA) field 612 is 6 bytes long, the source address (SA) field 614 is 6 bytes long, the NAN BSSID field 616 is 6 bytes long, the sequence control field 618 is 2 bytes long, the high-throughput (HT) control field 619 is 4 bytes long, the category field 660 is 1 byte long, the action field 662 is 1 byte long, and the frame check sequence (FCS) 606 is 4 bytes long. In various embodiments, the NAN discovery frame 600 can omit one or more fields shown in FIG. 6 and/or include one or more fields not shown in FIG. 6, including any of the fields discussed herein. A person having ordinary skill in the art will appreciate that the fields in the NAN discovery frame 600 can be of different suitable lengths, and can be in a different order.

In various embodiments, one or more of the frame control (FC) field 608, the duration field 610, the destination address (DA) field 612, the source address (SA) field 614, the sequence control field 618, the timestamp 620, and the frame check sequence (FCS) 606 can include the frame control (FC) field 408, the duration field 410, the destination address (DA) field 412, the source address (SA) field 414, the sequence control field 418, the timestamp 420, and the frame check sequence (FCS) 406 described above with respect to FIG. 4, respectively. Accordingly, the frame control (FC) field 608, the duration field 610, the destination address (DA) field 612, the source address (SA) field 614, the NAN BSSID field 616, and the sequence control field 618 can be configured to have the same format as a legacy MAC header, such as the MAC header 402 of FIG. 4. The NAN discovery frame 600 can be formatted for processing by legacy hardware, without modification.

In some embodiments, the NAN BSSID field 616 can have the same format as the BSSID field 416 described above with respect to FIG. 4, but can be interpreted differently. In one embodiment, the NAN BSSID 616 can include a predetermined or token BSSID, used in all NAN synchronization frames. Accordingly, different networks can include the same NAN BSSID in synchronization frames. The token BSSID can be preset, universally known, and/or dynamically determined. In some embodiments, the DA field 612 can be set to a broadcast address, and the SA field 614 can be set to a sender address.

In another embodiment, each NAN can have a different (for example, pseudorandom) NAN BSSID. In an embodiment, the NAN BSSID can be based on a service application. For example, a NAN created by Application A can have a BSSID based on an identifier of Application A. In some embodiments, the NAN BSSID 516 can be defined by a standards-body. In some embodiments, the NAN BSSID 516 can be based on other contextual information and/or device characteristics such as, for example, a device location, a server-assigned ID, etc. In one example, the NAN BSSID 516 can include a hash of the latitude and longitude location of the NAN.

In an embodiment, the frame control field 608 can include a type indicator. The FC 608 type indicator can indicate that the NAN discovery 600 is a management frame. In various embodiments, the NAN discovery frame 600 can be a public action frame. The service identifier 664, connection setup information 666, and/or additional NAN information can be carried as information elements in the public action frame. In an embodiment, a STA 106 (FIG. 1) can set the type indicator to a public action frame.

In an embodiment, the service identifier 664 can indicate service information for the NAN discovery frame 600. In an embodiment, the SA field 614 can include a device identifier of a transmitting device. In an embodiment, the connection setup information field 666 can include information indicating one or more connection parameters such as, for example, use of WiFi direct for connection establishment.

FIG. 7 illustrates an example neighborhood aware network discovery frame 700. In the illustrated embodiment, the NAN discovery frame 700 includes a category field 710, an action field 720, and one or more discovery type length value (TLV) fields 730-750. As shown, the category field 710 is one octet long, the action field 720 is one octet long, and the one or more TLV fields 730-750 are each of variable length. In various embodiments, the NAN discovery frame 700 can omit one or more fields shown in FIG. 7 and/or include one or more fields not shown in FIG. 7, including any of the fields discussed herein. For example, the NAN discovery frame 700 can include any of the fields described above with respect to the NAN discovery frame 600 of FIG. 6. A person having ordinary skill in the art will appreciate that the fields in the NAN discovery frame 700 can be of different suitable lengths, and can be in a different order.

In some embodiments, the category field 710 can indicate a public action frame. The action field 720 can indicate a discovery frame. The TLV fields 730-750 are described herein in greater detail with respect to FIG. 9.

FIG. 8 illustrates an example vendor-specific discovery frame 800. In the illustrated embodiment, the vendor-specific discovery frame 800 includes a category field 810, an action field 820, an organizationally unique identifier (OUI) field 830, an OUI type field 840, an OUI subtype 850, a dialog token 860, and one or more discovery type length value (TLV) fields 870-880. As shown, the category field 810 is one octet, the action field 820 is one octet, the OUI field 830 is three octets, the OUI type field 840 is one octet, the OUI subtype 850 is one octet, the dialog token 860 is one octet, and the one or more discovery TLV fields 870-880 are of variable length. In various embodiments, the vendor-specific discovery frame 800 can omit one or more fields shown in FIG. 8 and/or include one or more fields not shown in FIG. 8, including any of the fields discussed herein. For example, the vendor-specific discovery frame 800 can include any of the fields described above with respect to the vendor-specific discovery frame 600 of FIG. 6. A person having ordinary skill in the art will appreciate that the fields in the vendor-specific discovery frame 800 can be of different suitable lengths, and can be in a different order.

In some embodiments, the category field 710 can indicate a public action frame. The action field 720 can indicate a vendor-specific action frame. The OUI field 830 can be used to uniquely identify a vendor, manufacturer, or other organization (referred to as an "assignee") globally or worldwide and can effectively reserve a block of each possible type of derivative identifier (such as MAC addresses, group addresses, Subnetwork Access Protocol identifiers, etc.) for the exclusive use of the assignee. The OUI type field 840 can be used to indicate a type of the OUI field 830 such as, for example, a MAC identifier, a context dependent identifier (CDI), an extended unique identifier (EUI), etc. The OUI subtype field 850 can indicate a subtype of the OUI type field 840. The dialog token 860 can be chosen to indicate a particular transaction. The TLV fields 830-750 are described herein in greater detail with respect to FIG. 9.

Figure 9:
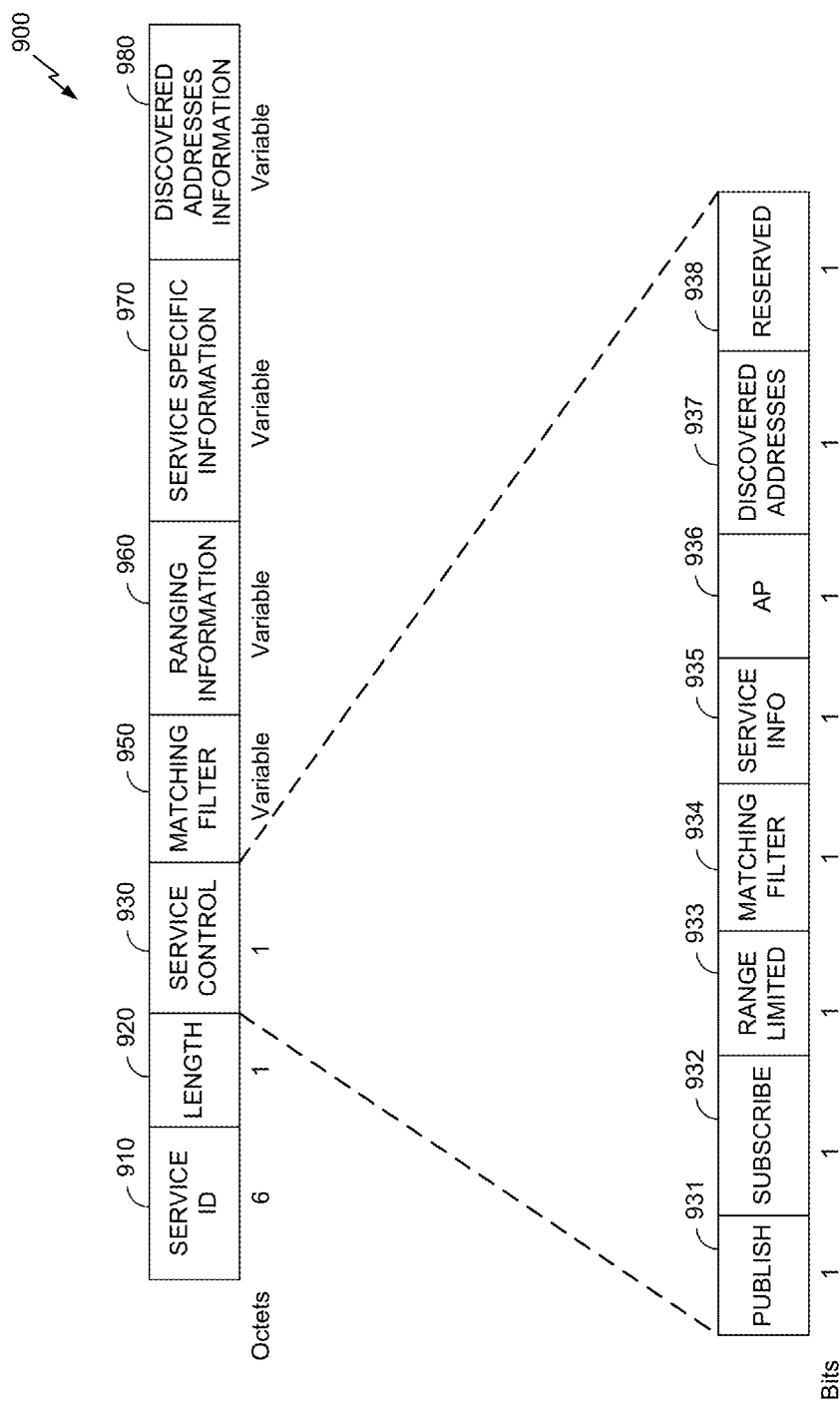
FIG. 9 shows an exemplary discovery type length value (TLV) that can be employed within the wireless communication system of FIG. 1.

FIG. 9 shows an exemplary discovery type length value (TLV) 900 that can be employed within the wireless communication system 100 of FIG. 1. In various embodiments, any device described herein, or another compatible device, can transmit the discovery TLV 900 such as, for example, the AP 184 (FIG. 1), a STA 186a-106d (FIG. 1), and/or the wireless device 202 (FIG. 2). One or more messages in the wireless communication system 100 can include the discovery TLV 900 such as, for example, the beacon 400 (FIG. 4), the beacon 500 (FIG. 5), the discovery frame 600 (FIG. 6), a probe response, and/or a discovery query frame. In one embodiment, the discovery TLV 900 can include the discovery TLV 730-750 and/or 870-880 described above with respect to FIGS. 7 and 8. One or more fields of the TLV 900 can be included in an attribute of an information element, in addition to, or instead of the frame 900. For example, the attribute can be in a vendor-specific IE.

In the illustrated embodiment, the discovery TLV 900 includes a service identifier 910, a length field 920, a service control field 930, a matching filter container 950, a ranging information container 960, a service specific information container 970, and a discovered addresses information container 980. A person having ordinary skill in the art will appreciate that the discovery TLV 900 can include additional fields, and fields can be rearranged, removed, and/or resized. For example, in various embodiments, the discovery TLV 900 can omit the service control field 930 and/or the matching filter container 950.

The service identifier field 910 shown is six octets long. In some implementations, the service identifier field 910 can be two, five, or twelve octets long. In some implementations, the service identifier field 910 can be of variable length, such as varying length from signal to signal and/or as between service providers. The service identifier field 910 can include a value which identifies a service or application of a discovery frame. For example, the service identifier 910 can include a hash of a service name or other value based on a service. In some embodiments, a predetermined token value can be reserved. For example, service identifiers of all-zeros or all-ones can indicate NAN management operations.

The length field 920 can be used to indicate the length of the discovery TLV 900 or the total length of subsequent fields. The length field 920 shown in FIG. 9 is one octet long. In some implementations, the length field 920 can be two, five, or twelve octets long. In some implementations, the length field 920 can be of variable length, such as varying length from signal to signal and/or as between service providers. In some embodiments, a length of zero (or another predetermined token value) can indicate that one or more other fields (such as the service control field 930, the matching filter container 950, the ranging information container 960, the service specific information container 970, and/or the discovered addresses information container 980) are not present.

The service control field 930 can indicate information of an applicable service. The service control field 930 shown in FIG. 9 is one octet long. In some implementations, the service control field 930 can be two, six, or eight octets long. In some implementations, the service control field 930 can be of variable length, such as varying length from signal to signal and/or as between service providers. The service control field 930 includes a publish flag 931, a subscribe flag 932, a range limited flag 933, a matching filter flag 934, a service information flag 935, an AP flag 936, a discovered addresses flag 937, and a reserved bit. A person having ordinary skill in the art will appreciate that the service control field 930 can include additional fields, and fields can be rearranged, removed, and/or resized.

In the illustrated embodiment, the publish flag 931, the subscribe flag 932, the range limited flag 933, the matching filter flag 934, the service information flag 935, the AP flag 936, and the discovered addresses flag 937 are each one bit long. In various embodiments, the matching filter flag 934 can indicate whether the matching filter container 950 is present in the discovery TLV 900. The service information flag can indicate whether the service specific information container 970 is present in the discovery TLV 900. The AP flag 936 can indicate whether the discovery TLV 900 is transmitted by an AP. The discovered addresses flag 937 can indicate whether the discovered addresses information container 980 is present in the discovery TLV 900.

The matching filter container 950 can indicate matching filter information. The matching filter container 950 shown in FIG. 9 is a variable length. In some implementations, the matching filter container 950 can be two, six, or eight octets long. The matching filter container 950 can include a matching filter length field and/or a matching filter for the NAN. The matching filter length field can indicate the length of the matching filter. The matching filter length field can be one octet long. In an embodiment, the matching filter length can be zero (or another predetermined token value) and the matching filter can be omitted. The matching filter can be a variable length. A person having ordinary skill in the art will appreciate that the matching filter container 950 can include additional fields, and fields can be rearranged, removed, and/or resized.

The ranging information container 960 can indicate ranging information. The ranging information container 960 shown in FIG. 9 is a variable length. In some implementations, ranging information container 960 can be two, six, or eight octets long. The ranging information container 960 can include one or more of a range information length field, a range control field, and a ranging information field. A person having ordinary skill in the art will appreciate that the ranging information container 960 can include additional fields, and fields can be rearranged, removed, and/or resized.

The range information length field can indicate a length of the ranging information field. The range information length field can be one octet long. In an embodiment, the ranging information length field can be zero (or another predetermined token value) and the ranging information field can be omitted. The range control field can indicate a ranging algorithm type. The range control field can be one octet long. A person having ordinary skill in the art will appreciate that the range control field can include additional fields, and fields can be rearranged, removed, and/or resized. The ranging information field can be used to indicate ranging information such as, for example, a ranging algorithm identification, ranging data, etc. The ranging information field can be a variable length. In some implementations, the ranging information field can be one, five, or twelve octets long.

The service-specific information container 970 can encapsulate one or more additional data fields related to an applicable service. The service-specific information container 970 shown in FIG. 9 is a variable length. In some implementations, the service-specific information container 970 can be one, five, or twelve octets long. The service-specific information container 970 can include a service-specific information length field and/or a service-specific information field. The service-specific information length field can indicate the length of the service-specific information field. In an embodiment, the service-specific information length field can be zero (or another predetermined token value) and the service-specific information field can be omitted. The service-specific information field can be a variable length. In some implementations, the service-specific information field can be one, five, or twelve octets long.

Figure 10:
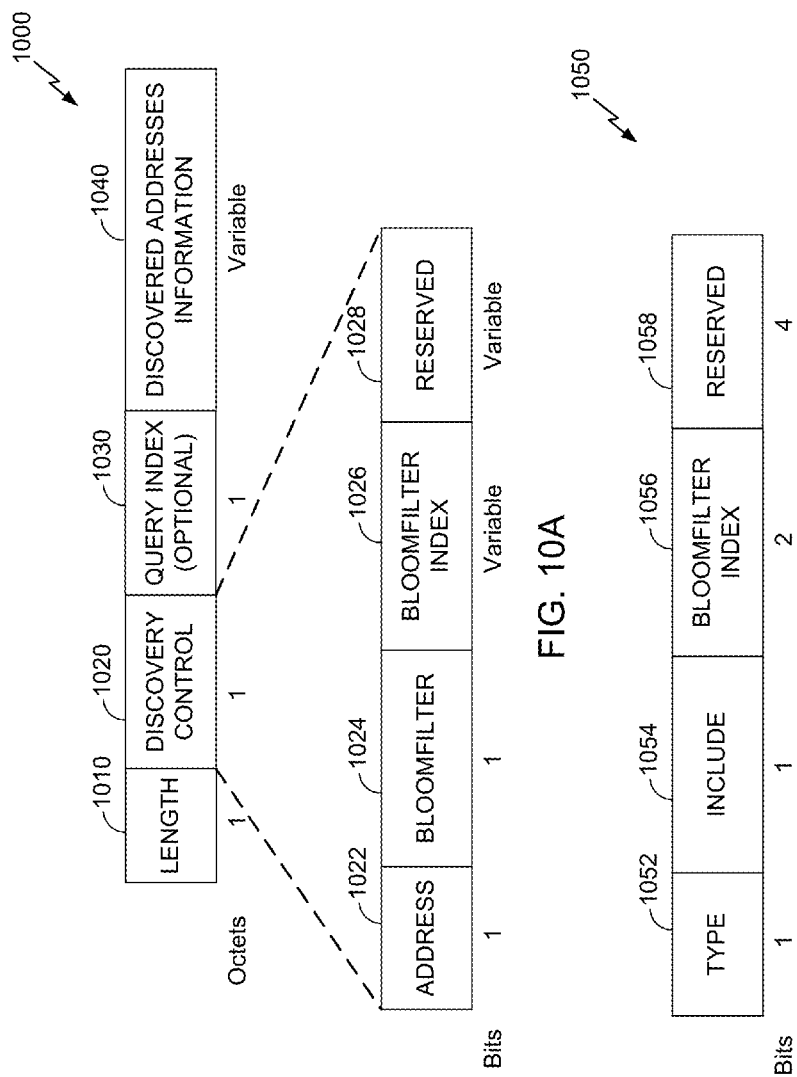
FIG. 10A shows an exemplary discovered addresses information container that can be employed within the wireless communication system of FIG. 1.
FIG. 10B shows an exemplary discovered addresses information container that can be employed within the wireless communication system of FIG. 1.

The discovered addresses information container 980 can indicate one or more addresses of devices that have been discovered by the transmitting device 202 (FIG. 2). The discovered addresses information container 980 shown in FIG. 9 is a variable length. In some implementations, the discovered addresses information container 980 can be one, five, or twelve octets long. The discovered address information container 980 is described in greater detail below with respect to FIG. 10A.

Referring back to FIG. 3, in some embodiments, the DW 304 can include a discovery query window and a discovery response window. In various embodiments, the discovery query window and the discovery response window can overlap. During the discovery query window, searching APs or STAs can send discovery query messages in a discovery action frame. Responding APs or STAs can respond to queries in the discovery response window. Listening APs or STAs can receive discovery query responses to searching APs or STAs. Some of the discovery responses may be missed by one or more listening APs. In some embodiments, discovery response queries can indicate one or more addresses of devices that have been discovered by the transmitting device 202 (FIG. 2). Responding APs or STAs can transmit additional discovery responses accordingly.

FIG. 10A shows an exemplary discovered addresses information container 1000 that can be employed within the wireless communication system 100 of FIG. 1. In various embodiments, any device described herein, or another compatible device, can transmit the discovered addresses information container 1000 such as, for example, the AP 184 (FIG. 1), a STA 186a-106d (FIG. 1), and/or the wireless device 202 (FIG. 2). One or more messages in the wireless communication system 100 can include the discovered addresses information container 1000 such as, for example, the beacon 400 (FIG. 4), the beacon 500 (FIG. 5), the discovery frame 600 (FIG. 6), a probe response, and/or a discovery query frame. In one embodiment, the discovered addresses information container 1000 can include the discovered addresses information container 980 described above with respect to FIG. 9.

In the illustrated embodiment, discovered addresses information container 1000 includes a length field 1010, a discovery control field 1020, an optional query index 1030, and discovered address information 1040. A person having ordinary skill in the art will appreciate that the discovery TLV 900 can include additional fields, and fields can be rearranged, removed, and/or resized. For example, in various embodiments, the discovered address information 1040 can be omitted when no devices have been discovered.

The length field 1010 can be used to indicate the length of the discovered addresses information container 1000 or the total length of subsequent fields. The length field 1010 shown in FIG. 10A is one octet long. In some implementations, the length field 1010 can be two, five, or twelve octets long. In some implementations, the length field 1010 can be of variable length, such as varying length from signal to signal and/or as between service providers. In some embodiments, a length of zero (or another predetermined token value) can indicate that one or more other fields (such as the discovery control field 1020 and/or the discovered addresses information field 1040) are not present.

The discovery control field 1020 can indicate control information for the discovered address information 1040. The discovery control field 1020 shown in FIG. 10A is one octet long. In some implementations, the discovery control field 1020 can be two, six, or eight octets long. In some implementations, the discovery control field 1020 can be of variable length, such as varying length from signal to signal and/or as between service providers. The discovery control field 1020 includes an address flag 1022, a Bloom filter flag 1024, a Bloom-filter index 1026, and one or more reserved bits 1028. A person having ordinary skill in the art will appreciate that the discovery control field 1020 can include additional fields, and fields can be rearranged, removed, and/or resized.

The address flag 1022 can indicate whether the discovered address information 1040 includes full or partial address information on discovered devices. The address flag 1022 shown in FIG. 10A is one bit. The Bloom filter flag 1024 can indicate whether the discovered address information 1040 includes a Bloom filter of discovered device addresses (described below with respect to FIG. 11). The Bloom filter flag 1024 shown in FIG. 10A is one bit. The Bloom filter index 1026 can indicate a set of hash functions used in the Bloom filter. The Bloom filter index shown in FIG. 10A is a variable length.

The query index 1030 can identify a particular discovery query. The query index 1030 shown in FIG. 10A is one octet long. In some implementations, the query index 1030 can be two, six, or eight octets long. In some implementations, the query index 1030 can be of variable length, such as varying length from signal to signal and/or as between service providers. The query index 1030 can be incremented, decremented, or otherwise modified each time a follow-up query is transmitted. In an embodiment, the Bloom filter index 1026 can be modified when the query index 1030 is modified.

The discovered address information 1040 can indicate one or more addresses of discovered devices. The discovered address information 1040 shown in FIG. 10A is a variable length. In various implementations, discovered address information 1040 can be 50, 100, or 200 octets long. In some embodiments, the discovered address information 1040 can include a list of full or partial addresses of discovered devices. The list can be encoded or filtered. In some embodiments, the discovered device addresses are represented by a Bloom filter (described below with respect to FIG. 11). A receiving device can receive the discovered address information 1040 and can determine whether the receiving device address is contained in the device address information 1040. If the receiving device address is not contained in the device address information 1040, the receiving device can transmit one or more discovery packets to announce its presence in the NAN.

FIG. 10B shows an exemplary discovery control field 1050 that can be employed within the wireless communication system 100 of FIG. 1. In various embodiments, any device described herein, or another compatible device, can transmit the discovered addresses information container 1000 such as, for example, the AP 184 (FIG. 1), a STA 186*a*-106*d* (FIG. 1), and/or the wireless device 202 (FIG. 2). One or more messages in the wireless communication system 100 can include the discovery control field 1050 such as, for example, the beacon 400 (FIG. 4), the beacon 500 (FIG. 5), the discovery frame 600 (FIG. 6), a probe response, and/or a discovery query frame. In one embodiment, the discovered addresses discovery control field 1050 can include the discovery control field 1020 described above with respect to FIG. 10A.

The discovery control field 1050 can indicate control information for the discovered address information 1040. In various embodiments, the discovery control field 1050 can be referred to as a query response inclusion filter (QRIF) control field, and can be included in a QRIF attribute. The discovery control field 1050 shown in FIG. 10B is one octet long. In some implementations, the discovery control field 1050 can be two, six, or eight octets long. In some implementations, the discovery control field 1050 can be of variable length, such as varying length from signal to signal and/or as between service providers. The discovery control field 1050 includes a type flag 1052, an include flag 1054, a Bloom-filter index 1056, and four reserved bits 1058. A person having ordinary skill in the art will appreciate that the discovery control field 1050 can include additional fields, and fields can be rearranged, removed, and/or resized.

The type flag 1052 can indicate whether the discovered address information 1040 is a sequence of partial MAC addresses or a Bloom filter of discovered device addresses (described below with respect to FIG. 11). The type flag 1052 shown in FIG. 10B is one bit. The include flag 1054 can indicate whether or not the STAs indicated in the discovered addresses information 1040 should send responses to the received discovery frame. The include flag 1054 shown in FIG. 10B is one bit. The Bloom filter index 1056 can indicate a set of hash functions used in the Bloom filter. The Bloom filter index shown in FIG. 10B is two bits long.

Figure 11:
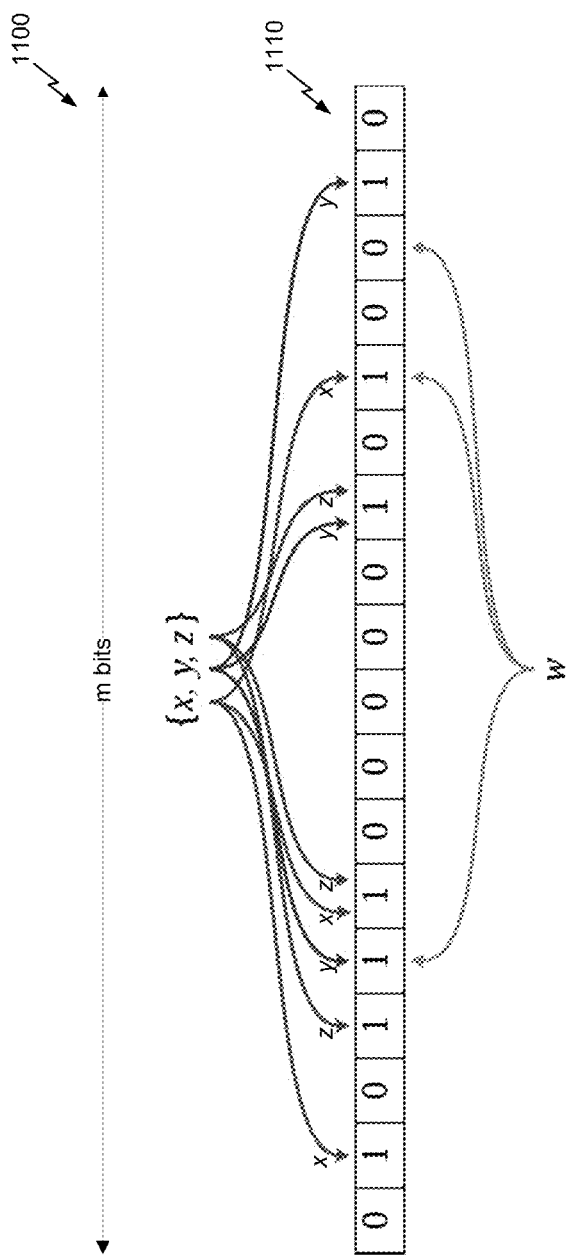
FIG. 11 shows one illustrative example of a Bloom filter in accordance with one implementation.

FIG. 11 shows one illustrative example of a Bloom filter 1100 in accordance with one implementation. The Bloom filter 1100 is a space efficient probabilistic data structure. The Bloom filter includes a bit array of m bits and k different hash functions. Each bit may have a value of zero or one. Each of the k different hash functions maps an input string to one of the m array positions with a uniform random distribution. In an exemplary implementation, the m bits are all initialized to zero. Whenever an identifier is received, the identifier is added into the Bloom filter 1100. Said adding the identifier 1100 includes a) feeding the identifier as an input string to each of the k hash functions, wherein each hash function maps the input string to one array position, and b) setting the bits at the array positions identified by the k hash functions to one.

As described above, the Bloom filter 1100 includes k different hash functions, each of which maps an input string to a bit position in the bit array. The hash function may be, for example, a cyclic redundancy check (CRC) of an input string. In one implementation, the k different hash functions may be created using a single hash function (e.g., a CRC such as CRC32) and k different strings (referred to as the "modification string"). For each input string to the Bloom filter (referred to as the "Bloom input string"), k different input strings (referred to as the "hash input strings") are generated, wherein each hash input string is created by appending the Bloom input string with a different one of the k modification strings. Subsequently, each of the k different hash input strings is fed into the single hash function thus generating a bit positions in the bit array. As there are k different hash input strings, k bit positions in the bit array are identified (some of them may be the same pit position). As a result, the Bloom filter 1100 simulates k different hash functions using a single hash function and k different strings.

In another implementation, the k hash input strings may be created in a different way. In one example, each hash input string may be created by appending a different one of the modification strings to the Bloom input string. In another example, each hash input hash input string may be created by inserting a different one of the modification strings in between the Bloom input string.

As described above, the Bloom filter 1100 includes a bit array of m bits and k different hash functions. In one implementation, the number of hash functions k has a value of 1, and the size of the bit array m has a value being about two times the maximal size of the wireless network to be estimated. In one implementation, the number of hash functions k has a value of 4. In one implementation, the size of the bit array m has a value being about five times the maximal size of the wireless network to be estimated. In one implementation, the number of hash functions k has a value of 4. In one implementation, the size of the bit array m has a value being about five times the number of entries to be inserted. In another implementation, the size of the Bloom filter 1100 (the value of the parameters m and k) may be determined based on the desired number of distinct identifiers to be stored in the Bloom filter 1100 (denoted by n) and the desired false alarm probability (denoted by p) that an identifier that has not been added in the filter being determined as being in the Bloom filter 1100, using the following Equations 1 and 2:

$$m = -n * \ln(p)/(\ln(2))^2 \qquad (1)$$

$$k = (m/n)\ln(2) \qquad (2)$$

In one implementation, the identifier in the message may be associated with the neighboring wireless device, or a service or an application. The identifier in the message may be a MAC address of a discovery frame which identifies the wireless device sending the frame. The identifier may also be a service identifier in a frame, wherein the service identifier may be in the body of the frame or may replace one of address fields in the frame. As another example, the identifier may be an identifier based on the particular application and located in the body of the frame.

The Bloom filter 1100 shown in FIG. 11 includes a bit array (1110) of m bits all initialized to zero and k different hash functions (not shown), wherein m=18 and k=3. Each of the k different hash functions maps or hashes an input string to one of the m array positions with a uniform random distribution. Three input strings, namely, x, y, and z, have been added into the Bloom filter 1100. For the input string x, the Bloom filter 1100 maps it to three different bit positions in the bit array (using the k hash functions not shown), as indicated by the three arrows initiating at x in FIG. 11. As a result, the three bit positions corresponding to the input string "x" all have a value of 1. Similarly, the input strings y and z are added into the Bloom filter 1100, by mapping each of these strings to three different bit positions in the bit array and setting these bits positions to a value of 1. The resulted bit array of the Bloom filter 1100 is shown in FIG. 11. To determine whether an input string w has been added into the Bloom filter 1100, the Bloom filter 1100 maps the input string w to three bit positions in the bit array, as indicated by the three arrows initiating at w. As one of the bit positions corresponding to the input string w has a value of 0, it is determined that the input string w is not in the Bloom filter. This determination is correct because the Bloom filter only stores x, y, and z, not w.

In one embodiment, each hash function H(j,X,m) can be defined as shown in Equation 3 below, where j is a modification string, X is the input string, and m is the length or size of the bloom filter, "||" is a concatenation operation, and "&" is a bit-wise AND operation:

$$H(j,X,m) = CRC32((j||X) \& 0x0000FFFF) \bmod m \qquad (3)$$

TABLE 1

| Set | Bloom Filter Index | Hash Functions |
|---|---|---|
| 1 | 0b00 | H(0x00, X, m), H(0x01, X, m), H(0x02, X, m), H(0x03, X, m) |
| 2 | 0b01 | H(0x04, X, m), H(0x05, X, m), H(0x06, X, m), H(0x07, X, m) |

TABLE 1-continued

| Set | Bloom Filter Index | Hash Functions |
|---|---|---|
| 3 | 0b10 | H(0x08, X, m), H(0x09, X, m), H(0x0A, X, m), H(0x0B, X, m) |
| 4 | 0b11 | H(0x0C, X, m), H(0x0D, X, m), H(0x0E, X, m), H(0x0F, X, m) |
| ... | ... | ... |

In an embodiment, the bloom filter index 1026 (FIG. 10A) can indicate sets of hash functions as shown in Table 1, above. Thus, in one example, the wireless device 202 (FIG. 2) can select a bloom filter index 1026 of 0b00. For the first hash function H(0x00,X,m), the wireless device 202 can append a discovered device identifier to 0x00, take the last two bytes of the result modulus m, and insert the result into the bloom filter. The wireless device 202 can repeat the procedure for the second through fourth hash functions H(0x01,X,m), H(0x02,X,m), and H(0x03,X,m). The wireless device 202 can encode the bloom filter index 1026 in a discovery frame including the bloom filter 1040, and transmit the discovery frame.

On the receiving side, the wireless device 202 can receive a discovery frame including the bloom filter index 1026 and the bloom filter 1040. In one example, the bloom filter index 1026 can be 0b11. For the first hash function H(0x0C,X,m), the wireless device 202 can append a its own device identifier to 0x0C, take the last two bytes of the result modulus m, and check the result the bloom filter 1040. The wireless device 202 can repeat the procedure for the second through fourth hash functions H(0x0D,X,m), H(0x0E,X,m), and H(0x0F,X,m). If the checked bits are set in the bloom filter 1040, the wireless device 202 can determine that it has already been discovered, and can refrain from transmitting additional announcements.

Although Table 1 shows an example where k=4, and the bloom filter index 1026 is two bits long, a person having ordinary skill in the art will appreciate that other configurations can be used. Although Equation 3 uses a CRC32 function, other hash functions can be used. Although Equation 3 appends X to j, j can be appended to X, inserted into the middle of X, interleaved with X, or vice versa. Although Equation 3 uses only the last two bytes of the concatenation result, other lengths can be used such as, for example, one bye, three byes, four bytes, etc.

Figure 12:
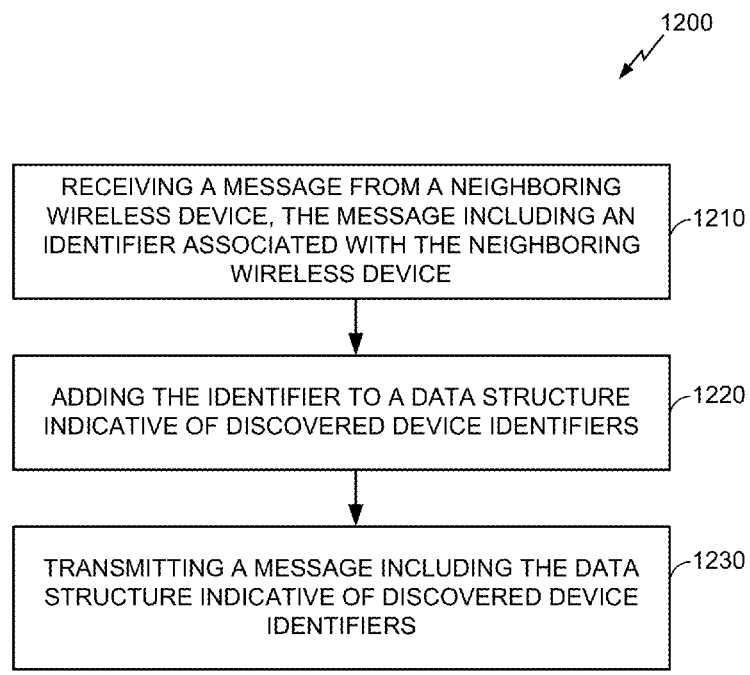
FIG. 12 shows a flowchart for an exemplary method of wireless communication that can be employed within the wireless communication system of FIG. 1.

FIG. 12 shows a flowchart 1200 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1210, the device 202 receives a message from a neighboring wireless device. The message includes an identifier associated with the neighboring wireless device. For example, the STA 106a can receive a discovery response frame from the STA 106b. In an embodiment, the received message can include a discovery response message. In an embodiment, the identifier can include a media access control (MAC) address.

Next, at block 1220, the device 202 adds the identifier to a data structure indicative of discovered device identifiers. In an embodiment, the data structure can include a list of at least partial identifiers. For example, the partial identifiers can include the last 3 bytes of the identifier. In other embodiments, other portions of the identifiers can be stored.

In an embodiment, the data structure includes a Bloom filter, as discussed above with respect to FIG. 10A. The Bloom filter can include a bit array of m bits with k different hash functions associated with the bit array. Each hash function can map an input string to one of the m array positions with a uniform random distribution. Said adding the identifier can include feeding the identifier to each of the k hash functions to get k array positions and setting the bits at all the k array positions to 1. In an embodiment, at least one of the k hash functions is a cyclic redundancy check of an input string. In an embodiment, the parameter k of the Bloom filter has a value of 1, and the parameter m of the Bloom filter has a value being about twice the maximum size of the wireless network.

Then, at block 1230, the device 202 transmits a message including the data structure indicative of discovered device identifiers. For example, the STA 106a can broadcast a discovery query frame to the STAs 106b-106-d and the AP 104. In an embodiment, the transmitted message can include the discovered address information container 1000, discussed above with respect to FIG. 10A. For example, the transmitted message can include a length field, a discovery control field, and a discovered addresses information field. The discovery control field can include an address flag, a Bloom filter flag, and Bloom filter index. In various embodiments, the length field is one octet, the discovery control field is one octet, the type flag is one bit, the include flag is one bit, the Bloom filter index is two bits, and the discovered addresses information field is a variable length. The discovery control field can further include a query index.

In an embodiment, the method can further include generating a second Bloom filter using a different set of hash functions. For example, one or more STAs may not respond to the discovery query message due to collisions in the Bloom filter. The device 202 can increment or otherwise modify the Bloom filter index, which can indicate the set of hash functions used to generate the Bloom filter in the discovered address information field. In an embodiment, the device 202 can further increment or otherwise modify the query index.

The method can further include transmitting a second message including the second Bloom filter. For example, the STA 106a can broadcast the second message to the STAs 106b-106d and the AP 104. The second message can have the same format as the first message. For example, the second message can include the discovered address information container 1000, discussed above with respect to FIG. 10A.

In an embodiment, the method shown in FIG. 12 can be implemented in a wireless device that can include a receiving circuit, an adding circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the message from the neighboring wireless device. In an embodiment, the receiving circuit can be configured to implement block 1210 of the flowchart 1200 (FIG. 12). The receiving circuit can include one or more of the receiver 212 (FIG. 2) and the antenna 216 (FIG. 2). In some implementations, means for receiving can include the receiving circuit.

The adding circuit can be configured to add the identifier to the data structure indicative of discovered device identifiers. In an embodiment, the adding circuit can be configured to implement block 1220 of the flowchart 1200 (FIG. 12). The adding circuit can include one or more of the processor 206 (FIG. 2) and the memory 204 (FIG. 2). In some implementations, means for adding can include the adding circuit.

The transmitting circuit can be configured to transmit the message including the data structure indicative of discovered device identifiers. In an embodiment, the transmitting circuit can be configured to implement block 1230 of the flowchart 1200 (FIG. 12). The transmitting circuit can include one or more of the transmitter 210 (FIG. 2) and the antenna 216 (FIG. 2). In some implementations, means for transmitting can include the transmitting circuit.

Figure 13:
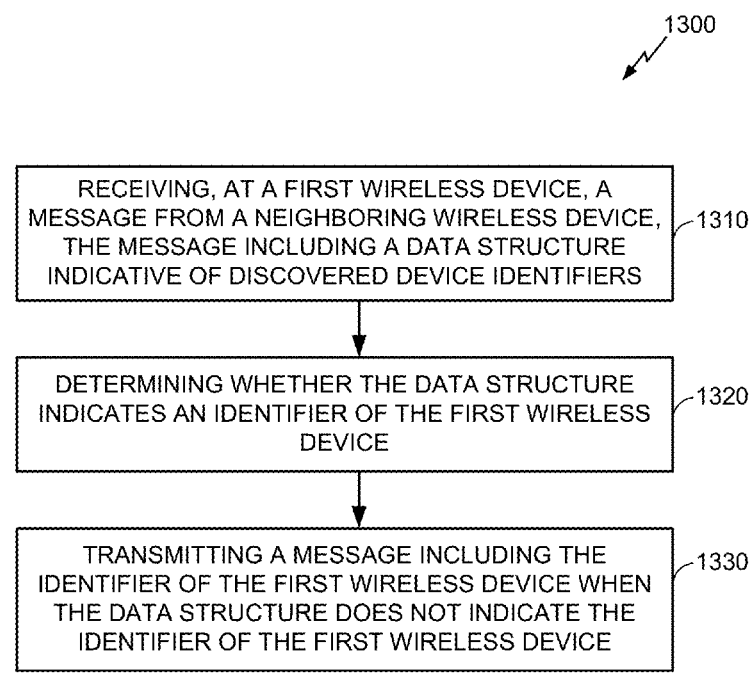
FIG. 13 shows a flowchart for an exemplary method of wireless communication that can be employed within the wireless communication system of FIG. 1.

FIG. 13 shows a flowchart 1300 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1310, the device 202 receives a message from a neighboring wireless device. The message includes a data structure indicative of discovered device identifiers. For example, the STA 106a can receive a discovery query frame from the STA 106b. In an embodiment, the received message can include a discovery query message. In an embodiment, the identifiers can include media access control (MAC) addresses.

In an embodiment, the received message can include the discovered address information container 1000, discussed above with respect to FIG. 10A. For example, the received message can include a length field, a discovery control field, and a discovered addresses information field. The discovery control field can include an address flag, a Bloom filter flag, and Bloom filter index. In various embodiments, the length field is one octet, the discovery control field is one octet, the type flag is one bit, the include flag is one bit, the Bloom filter index is two bits, and the discovered addresses information field is a variable length. The discovery control field can further include a query index.

In an embodiment, the data structure can include a list of at least partial identifiers. For example, the partial identifiers can include the last 3 bytes of the identifier. In other embodiments, other portions of the identifiers can be stored.

In an embodiment, the data structure includes a Bloom filter, as discussed above with respect to FIG. 10A. The Bloom filter can include a bit array of m bits with k different hash functions associated with the bit array. Each hash function can map an input string to one of the m array positions with a uniform random distribution. In an embodiment, at least one of the k hash functions is a cyclic redundancy check of an input string. In an embodiment, the parameter k of the Bloom filter has a value of 1, and the parameter m of the Bloom filter has a value being about twice the maximum size of the wireless network.

Next, at block 1320, the device 202 determines whether the data structure indicates an identifier of the device 202. In an embodiment, determining whether the data structure indicates the identifier of the device 202 can include mapping the identifier to each of the k hash functions to get k array positions, and determining whether the bits at all the k array positions are 1. In an embodiment, determining whether the data structure indicates the identifier of the device 202 can include comparing a full or partial identifier of the device 202 to a list of full or partial identifiers in the data structure.

If the data structure indicates the identifier of the device 202, the device 202 can determine that the neighboring wireless device has discovered the device 202 (although such determination may be a false positive due to collisions in the Bloom filter or partial identifier list). Accordingly, the device 202 can refrain from transmitting a query response. If the data structure does not indicate the identifier of the device 202, the device 202 can determine that the neighboring wireless device has not discovered the device 202 and can proceed to block 1330.

Then, at block 1330, the device 202 transmits a message including the identifier of the device 202 when the data structure does not indicate the identifier of the first wireless device. For example, the STA 106a can broadcast a discovery response frame to the STAs 106b-106-d and the AP 104.

In an embodiment, the method can further include receiving a second message including a second Bloom filter. The second Bloom filter can use a different set of hash functions. For example, the device 202 may not respond to the discovery query message due to collisions in the Bloom filter. The device 202 can determine that the Bloom filter index has been incremented or otherwise modified. The method can further include responding to the second message when the second Bloom filter does not indicate the identifier of the device 202.

In an embodiment, the second message can further include a query index. The device 202 can further determine whether the device 202 has previously responded to a query with the same query index. The method can further include responding to the second message when the second Bloom filter does not indicate the identifier of the device 202 and the device 202 has not previously responded to a query with the same query index.

In an embodiment, the method shown in FIG. 13 can be implemented in a wireless device that can include a receiving circuit, an determining circuit, and a transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the message from the neighboring wireless device. In an embodiment, the receiving circuit can be configured to implement block 1310 of the flowchart 1300 (FIG. 13). The receiving circuit can include one or more of the receiver 212 (FIG. 2) and the antenna 216 (FIG. 2). In some implementations, means for receiving can include the receiving circuit.

The determining circuit can be configured to determine whether the data structure indicates an identifier of the device 202. In an embodiment, the determining circuit can be configured to implement block 1320 of the flowchart 1300 (FIG. 13). The determining circuit can include one or more of the processor 206 (FIG. 2) and the memory 204 (FIG. 2). In some implementations, means for determining can include the determining circuit.

The transmitting circuit can be configured to transmit the message including the identifier of the device 202. In an embodiment, the transmitting circuit can be configured to implement block 1330 of the flowchart 1300 (FIG. 13). The transmitting circuit can include one or more of the transmitter 210 (FIG. 2) and the antenna 216 (FIG. 2). In some implementations, means for transmitting and/or means for responding can include the transmitting circuit.

As described herein, various fields, devices, and methods are described with respect to a beacon, such as the beacon 500 of FIG. 5. A person having ordinary skill in the art will appreciate that the fields, devices, and methods described herein can also be applied to other sync frames, which can be configured to convey timing information to synchronize NAN devices within a network. For example, a sync frame can include a discovery window information element indicating a start time of a discovery window and a discovery period indicator. In some embodiments, a sync frame having a beacon type can be referred to as a beacon.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed there or that the first element must precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communicating discovery information in a wireless neighborhood aware network (NAN), comprising:
   receiving a message from a neighboring wireless device, the message comprising an identifier associated with the neighboring wireless device;
   adding the identifier to a data structure indicative of discovered device identifiers; and
   transmitting a message comprising the data structure indicative of discovered device identifiers,
   wherein:
     the data structure comprises a Bloom filter,
     the Bloom filter is a bit array of m bits with k different hash functions associated with the bit array, wherein each hash function maps an input string to one of the m array positions with a uniform random distribution, and
     at least one of the k hash functions H(j,X,m) is defined as: (CRC32(j||X) & 0xFFFF) mod m, wherein j is a modification string, X is the input string, and CRC32 is a 32 bit cyclic redundancy code.

2. The method of claim 1, wherein the received message comprises a discovery response message.

3. The method of claim 1, wherein the transmitted message comprises a discovery query message.

4. The method of claim 1, wherein the data structure comprises a list of at least partial identifiers.

5. The method of claim 4, wherein the at least partial identifiers comprise a subset of bytes of the identifier.

6. The method of claim 1, wherein the message further comprises a Bloom filter index indicating a specific set of hash functions associated with the bit array.

7. The method of claim 6, wherein the Bloom filter index is updated in subsequent transmissions.

8. The method of claim 1, wherein said adding the identifier comprises:
feeding the identifier to each of the k hash functions to get k array positions; and
setting the bits at all the k array positions to 1.

9. The method of claim 1, wherein the parameter k of the Bloom filter has a value of 4, and the parameter m of the Bloom filter has a value being larger than 5 times a number of devices to indicate in the bloom filter.

10. The method of claim 1, further comprising:
generating a second Bloom filter using a different set of hash functions; and
transmitting a second message comprising the second Bloom filter.

11. The method of claim 1, wherein the transmitted message comprises a length field, a discovery control field, and a discovered addresses information field.

12. The method of claim 11, wherein the discovery control field comprises a type flag indicative of a presence of a Bloom filter, an include flag indicative of a desired station response, and a Bloom filter index identifying a specific set of hash functions associated with an associated Bloom filter.

13. The method of claim 12, wherein the length field is one octet, the discovery control field is one octet, the type flag is one bit, the include flag is one bit, the Bloom filter index is two bits, and the discovered addresses information field is a variable length.

14. The method of claim 12, wherein the include flag, when not set, indicates that devices indicated in the Bloom filter should not respond, and when set, indicates that only devices indicated in the Bloom filter should transmit.

15. The method of claim 12, wherein the discovery control field further comprises a query index.

16. The method of claim 1, wherein the identifier comprises a media access control (MAC) address.

17. A wireless device configured to communicate discovery information in a wireless neighborhood aware network (NAN), comprising:
a receiver configured to receive a message from a neighboring wireless device, the message comprising an identifier associated with the neighboring wireless device;
a memory configured to store a data structure indicative of discovered device identifiers;
a processor configured to add the identifier to the data structure stored in the memory; and
a transmitter configured to transmit a message comprising the data structure indicative of discovered device identifiers,
wherein:
the data structure comprises a Bloom filter,
the Bloom filter is a bit array of m bits with k different hash functions associated with the bit array, wherein each hash function mass an input string to one of the m array positions with a uniform random distribution, and
at least one of the k hash functions H(j,X,m) is defined as: (CRC32(j||X) & 0xFFFF) mod m, wherein j is a modification string, X is the input string, and CRC32 is a 32 bit cyclic redundancy code.

18. The wireless device of claim 17, wherein the received message comprises a discovery response message.

19. The wireless device of claim 17, wherein the transmitted message comprises a discovery query message.

20. The wireless device of claim 17, wherein the data structure comprises a list of at least partial identifiers.

21. The wireless device of claim 20 wherein the at least partial identifiers comprise a subset of bytes of the identifier.

22. The wireless device of claim 17, wherein the message further comprises a Bloom filter index indicating a specific set of hash functions associated with the bit array.

23. The wireless device of claim 22, wherein the Bloom filter index is updated in subsequent transmissions.

24. The wireless device of claim 17, wherein said adding the identifier comprises:
feeding the identifier to each of the k hash functions to get k array positions; and
setting the bits at all the k array positions to 1.

25. The wireless device of claim 17, wherein the parameter k of the Bloom filter has a value of 4, and the parameter m of the Bloom filter has a value being larger than 5times a number of devices to indicate in the bloom filter.

26. The wireless device of claim 17, wherein:
the processor is further configured to generate a second Bloom filter using a different set of hash functions; and
the transmitter is further configured to transmit a second message comprising the second Bloom filter.

27. The wireless device of claim 17, wherein the transmitted message comprises a length field, a discovery control field, and a discovered addresses information field.

28. The wireless device of claim 27, wherein the discovery control field comprises a type flag indicative of a presence of a Bloom filter, an include flag indicative of a desired station response, and a Bloom filter index identifying a specific set of hash functions associated with an associated Bloom filter.

29. The wireless device of claim 28, wherein the length field is one octet, the discovery control field is one octet, the type flag is one bit, the include flag is one bit, the Bloom filter index is two bits, and the discovered addresses information field is a variable length.

30. The wireless device of claim 28, wherein the include flag, when not set, indicates that devices indicated in the Bloom filter should not respond, and when set, indicates that only devices indicated in the Bloom filter should transmit.

31. The wireless device of claim 28, wherein the discovery control field further comprises a query index.

32. The wireless device of claim 17, wherein the identifier comprises a media access control (MAC) address.

33. An apparatus for communicating discovery information in a wireless neighborhood aware network (NAN), comprising:
means for receiving a message from a neighboring wireless device, the message comprising an identifier associated with the neighboring wireless device;
means for adding the identifier to a data structure indicative of discovered device identifiers; and
means for transmitting a message comprising the data structure indicative of discovered device identifiers,
wherein:
the data structure comprises a Bloom filter,
the Bloom filter is a bit array of m bits with k different hash functions associated with the bit array, wherein each hash function maps an input string to one of the m array positions with a uniform random distribution, and at least one of the k hash functions H(j,X,m) is defined as: (CRC32(j∥X) & 0xFFFF) mod m wherein is a modification string, X is the input string, and CRC32 is a 32 bit cyclic redundancy code.

34. The apparatus of claim 33, further comprising:
means for feeding the identifier to each of k different hash functions, each associated with a Bloom filter bit array of m bits, to get k array positions; and
means for setting the bits of the bit array at all the k array positions to 1.

35. The apparatus of claim 34, further comprising:
means for generating a second Bloom filter using a different set of hash functions; and
means for transmitting a second message comprising the second Bloom filter.

36. A non-transitory computer-readable medium comprising code that, when executed, cause an apparatus to:
receive a message from a neighboring wireless device, the message comprising an identifier associated with the neighboring wireless device;
add the identifier to a data structure indicative of discovered device identifiers; and
transmit a message comprising the data structure indicative of discovered device identifiers wherein:
the data structure comprises a Bloom filter,
the Bloom filter is a bit array of m bits with k different hash functions associated with the bit array, wherein each hash function maps an input string to one of the m array positions with a uniform random distribution, and
at least one of the k hash functions H(j,X,m) is defined as: (CRC32(j∥X) & 0xFFFF) mod m, wherein j is a modification string, X is the input string, and CRC32 is a 32 bit cyclic redundancy code.

37. The medium of claim 36, further comprising code that, when executed, causes the apparatus to add the identifier to the data structure by:
feeding the identifier to each of k different hash functions, each associated with a Bloom filter bit array of m bits, to get k array positions; and
setting the bits of the bit array at all the k array positions to 1.

38. The apparatus of claim 37, further comprising code that, when executed, causes the apparatus to:
generate a second Bloom filter using a different set of hash functions; and
transmit a second message comprising the second Bloom filter.

* * * * *